Nov. 12, 1957

C. A. FULLER 2,812,959

FLANGE UNION FITTING WITH GLAND EXPANDIBLE INTO AN OPENING

Filed Aug. 21, 1953

INVENTOR.
Chester A. Fuller
BY
Adelbert A. Steinmiller
ATTORNEY

United States Patent Office 2,812,959
Patented Nov. 12, 1957

2,812,959

FLANGE UNION FITTING WITH GLAND EXPANDIBLE INTO AN OPENING

Chester A. Fuller, Pittsburgh, Pa., assignor to Westinghouse Air Brake Company, Wilmerding, Pa., a corporation of Pennsylvania Application August 21, 1953, Serial No. 375,664

4 Claims. (Cl. 285—159)

This invention relates to flange union fittings and more particularly to flange union fittings of the gland type comprising a resilient element adapted for squeezing against the outer periphery of a tubular member, such as an unthreaded pipe, for establishing a pressure-tight fluid communication between said member and a ported device.

With such fittings there is difficulty in compensating for minor variations in pipe diameter. If the pipe is slightly oversize, excess resilient material may prevent the fitting from being tightly bolted to the device and/or result in breakage of the bolts due to vibration, as when the fitting is being used on mobile equipment like railway cars, or else result in leakage of fluid under pressure due to localized pinching and improper squeezing of the resilient element; while if the pipe is undersize, there may be insufficient resilient material to provide the requisite compression for a pressure-tight connection.

One object of this invention is therefore to provide an improved fitting of the above type which will establish a pressure-tight fluid connection between an unthreaded pipe and a ported device despite minor variations in the diameter or length of said pipe.

Also, with such fittings, the resilient element is generally squeezed between a stationary member and a pipe-encircling nut or member having screw-threaded connection with said stationary member; and since the nut is in direct contact with the resilient element, rotation of said nut to effect such connection and squeezing tends to tear the resilient element and break the seal sought to be effected by said resilient element.

Another object of the invention is therefore to provide an improved fitting embodying novel means for connecting a pipe to a ported device and at the same time squeezing a pipe-encircling resilient element without causing rotation of said resilient element or of any surface in direct engagement with said resilient element, so as to thereby eliminate the undesirable tendencies just described.

Another object of the invention is to provide an improved fitting of the above type capable of maintaining a pressure-tight fluid connection between a tubular member and a ported device at relatively high, as well as relatively low, fluid pressures.

Other objects and advantages will become apparent from the following more detailed description of the invention.

Figure 1:
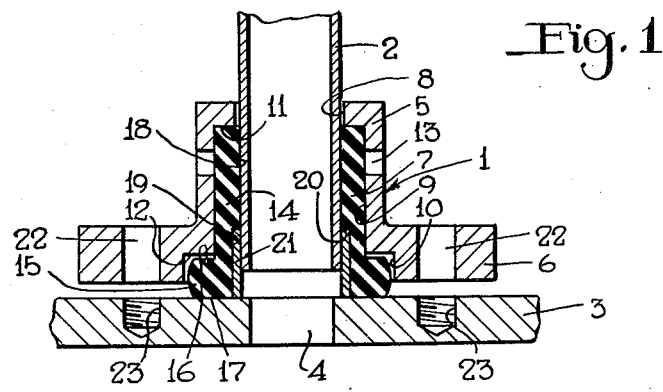
Figure 2:
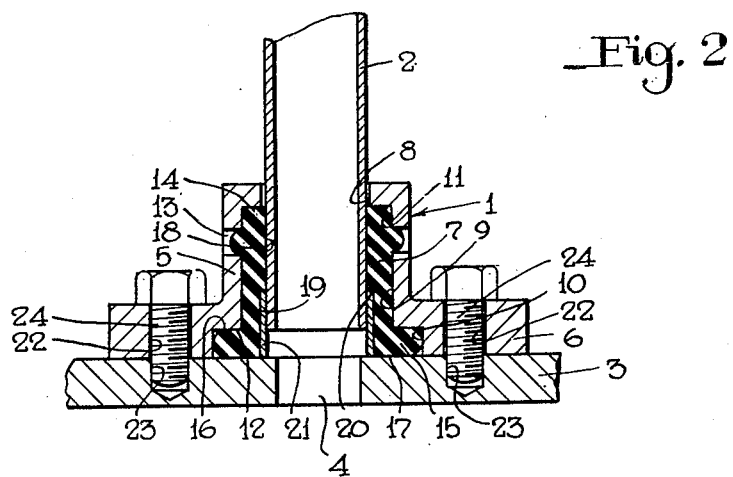

In the accompanying drawing, Fig. 1 is an elevational, sectional view of the improved fitting shown, in an unsqueezed or free state, associated with an unthreaded pipe and a device; Fig. 2 is an elevational, sectional view of said fitting shown associated with said pipe sealed and secured to said device through the medium of said fitting; and Fig. 3 is a side elevational, outline view of said pipe, fitting and device in their secured state.

Figure 3:
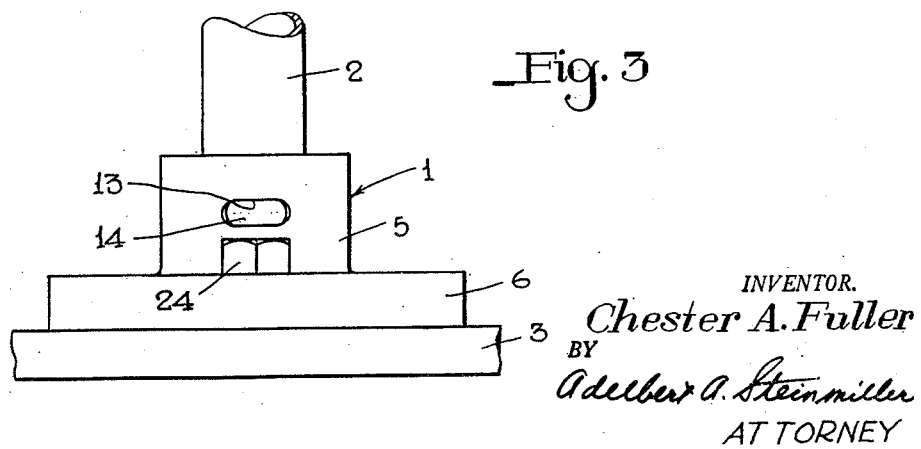

Referring to Figs. 2 and 3 of the drawing, the improved flange union fitting, designated generally by the reference numeral 1, is provided for connecting an unthreaded tubular member, such as a pipe 2, to a wall 3 of a device, such as a reservoir (not shown), having an opening 4 extending through said wall with which said pipe is to communicate.

As shown in Fig. 1 of the drawing, the fitting 1 comprises a relatively hard, such as metallic, body 5, preferably cylindrical, having at one end an integrally formed flange 6, which may be annular in form. The fitting 1 further comprises an element 7 formed of resilient material, such as rubber or a plastic compound, and adapted for squeezing or displacement into sealing engagement with the pipe 2, body 5 and wall 3 under action of an axially applied displacing force, in the manner to be explained presently.

The body 5 has a coaxially arranged, pipe-accommodating bore 8 extending inwardly from the unflanged end of said body and opening into one end of a coaxially aligned, larger bore 9 which at its opposite end opens, in turn, into a counterbore 10 extending inwardly from the flanged end of said body; the adjacent ends of the bores 8 and 9 being joined by a radial stop shoulder 11 preferably located in proximity of said unflanged end of the body, and the bore 9 and counterbore 10 being joined at their adjacent ends by a radial stop shoulder 12 located in a plane approximately midway between the faces of flange 6.

As also shown in Fig. 3 of the drawing, the body 5 has a plurality of elongated, preferably radial relief recesses or openings 13 extending, in proximity of the shoulder 11, from the bore 9 to or toward the outer periphery of said body and into which excess resilient material, if any, of element 7 may flow during application of the aforementioned displacing force, as will be understood from subsequent description.

The element 7 comprises a resilient sleeve 14 preferably having in surrounding relation to one end thereof an integrally formed, outwardly directed, annular resilient flange 15 having inner and outer radial surfaces 16 and 17, respectively.

The element 7 is adapted for insertion into the body 5 such that the unflanged end of sleeve 14 abuts the shoulder 11 and the outer periphery of the unflanged portion of said sleeve engages, without substantial radial squeezing, the wall of bore 9. In this partially assembled state, there may be substantially no clearance, or very small clearance, between the inner radial surface 16 of flange 6 and the shoulder 12, while the end of the sleeve 14 and the surrounding flange 15 are disposed within the counterbore 10 and project exteriorly thereof a distance sufficient to provide the requisite degree of displacement or squeezing of the element 7 upon application of the aforementioned displacing force; the outer diameter of flange 15 being sufficiently smaller than the diameter of counterbore 10 to permit the flange 15 to be flattened radially outward toward the annular wall of said counterbore during application of said force.

The sleeve 14 has a coaxially arranged bore 18 extending from the unflanged end of said sleeve and a coaxially aligned, larger bore 19 extending from the flanged end of said sleeve, said bores at their adjacent ends being joined by a radial seat shoulder 20 located in a plane approximately midway between the opposite ends of said sleeve. The diameter of bore 18 is slightly larger than that of the pipe 2 for facilitating insertion of said pipe into said bore. A relatively hard, such as metallic, retaining sleeve 21 is preferably provided for controlling the direction of displacement or flow of the resilient element 7, when the pipe 2 is of insufficient length to engage or substantially engage the wall 3 of the device, or said device is stationary and cannot be moved toward said pipe; the inner diameter of the sleeve 21 being slightly larger than that of pipe 2 for facilitating passage of said sleeve over the unthreaded end of said pipe.

The element 7 is preferably bonded to the sleeve 21 such that the wall of bore 19 and the shoulder 20 are bonded to the outer periphery and upper end, respectively, of said sleeve; although the sleeve 21 may, if desired, be separate from said element and slidably inserted into the bore 19 into seating engagement with the shoulder 20 with said element in its unsqueezed or free state.

The flange 6 is provided with a plurality of holes 22 which are so disposed as to be alignable, when the counterbore 10 is coaxially aligned with opening 4, with such as tapped holes 23 formed in the wall 3 to adapt the fitting 1 for connection to said wall, as through the medium of tap bolts 24.

In assembly, the element 7 is inserted in the body 5 and the unflanged end of said body is then passed over the unthreaded end of pipe 2, such that said pipe is disposed within the bores 8 and 18 of the body 5 and the resilient sleeve 14, respectively, and also partly within the metallic sleeve 21.

Next, the pipe 2 and fitting 1 are so positioned that the tap bolts 24 may be inserted into the holes 22 and 23 and wrench-tightened, each bolt being tightened a few turns at a time, seriatim, to prevent cocking of the body and/or pinching of the element 7. As the body 5 is drawn in the above manner toward and into engagement with the wall 3, the sleeve 14 is squeezed between the shoulder 11 and said wall causing it to be displaced into sealing engagement with the outer periphery of the pipe 2 and the wall of bore 8, while flange 15 is squeezed between the shoulder 12 and wall 3 so as to form a pressure-tight seal between the flanged end of body 5 and the wall 3.

During this squeezing of flange 15, resilient material will flow radially outward toward the annular wall of bore 8, being prevented from flowing in the opposite direction by the metallic retaining sleeve 21 which reinforces the resilient sleeve 14. It will of course be understood that if the pipe 2 is of such length as to substantially engage the wall 3 of the device, the retaining sleeve 21 may be eliminated, for the exterior of said pipe will prevent flow of resilient material of element 7 into the path of fluid flow.

Since the element 7 has sufficient resilient material to provide requisite squeezing with pipe of minimum diameter, any increase in pipe diameter above that minimum will correspondingly reduce the size of the annular space between the pipe and the wall of bore 8 and, during tightening of the bolts 14, result in an undesired excess of resilient material. This excess material is relieved by way of the novel relief openings 13 especially provided for that purpose, thus enabling the fitting 1 to compensate automatically for minor variations in pipe diameter and assuring that the body flange 6 will seat flush against the wall 3 even when the pipe 2 is oversize.

The fitting 1, through the medium of the metallic sleeve 21, also compensates for variation in pipe length between a maximum length, at which the pipe is so disposed within the sleeve 21 as to substantially abut the wall 3 in encirclement of opening 4, and a minimum length, at which there is just sufficient overlap of said sleeve and pipe to support and guide said sleeve without causing cocking or distortion of said sleeve during squeezing of the element 7.

*Summary*

It will now be seen that the improved flange union fitting establishes a pressure-tight fluid communication between an unthreaded pipe and a ported device irrespective of minor variations in the diameter and length of said pipe.

And it will also be seen that by tightening the tap bolts 24, the body 5 is connected to the wall 3 of the aforementioned device and at the same time the resilient element 7 is squeezed or displaced without causing rotation of either the resilient element or of any member having a surface directly engaging said resilient element.

Having now described my invention, what I claim as new and desire to secure by Letters Patent, is:

1. A fitting for connecting a tubular member to a device having an opening with which said member is to communicate, said fitting comprising a body having one end for engaging said device and also having a pipe-accommodating bore coaxially alignable with said opening and extending inwardly from an opposite end of said body to a coaxially aligned, larger bore and also having a counterbore extending coaxially inward from said one end to said larger bore, said larger bore being joined at opposite ends to said bore and counterbore by first and second stop shoulders, respectively, a resilient element comprising a sleeve having at one end an outwardly directed annular flange, said element being insertable into said body such that, in a free state, the unflanged part of said element substantially abuts said first shoulder and said flange is disengaged from said second shoulder and projects exteriorly of said one end of said body and is of smaller outer diameter than the diameter of said counterbore to accommodate excess resilient material of said flange displaced during squeezing of said element, said element being provided with a coaxially arranged pipe-encircling bore and a coaxially aligned, larger bore extending into junction with each other from the unflanged and flanged ends, respectively, of said element, a relatively hard retaining sleeve for engaging said device in encirclement of the opening therein and also engaging the wall of said larger bore of said element and mountable over the end of said member for controlling direction of deformation of said resilient element during squeezing thereof, said body being provided with at least one relief opening extending from the outer periphery of said body to said larger bore thereof for receiving excess resilient material of the unflanged part of said element displaced during said squeezing, and means operative to cause engagement of said body with said device by a translational movement and thereby cause such squeezing of said resilient element for establishing a pressure-tight fluid connection between said member and said device.

2. A flange union fitting for effecting a pressure-tight fluid connection between a device having a port through a face thereof and a tubular conduit means substantially engaging said face, said fitting comprising a body having a mating face for engaging the face of the device and having a large circular opening extending inwardly from said mating face and joined by an annular shoulder to a coaxially aligned smaller circular opening within which the tubular means is accommodated with slight radial clearance, a sleeve-like resilient element encircling the part of the tubular means projecting into said large opening and in a free state having an axial length greater than the distance between said shoulder and mating face, said body having at least one relief recess that opens through the wall of said large opening for accommodating excess resilient material of said element displaced during squeezing thereof, and means for effecting connection of said body to said device by a translational movement that causes squeezing of said element between said shoulder and the face of the device and against the wall of said large opening and exterior of the tubular means whereby a radial sealing force is imposed on said tubular means.

3. In combination, a device having a port that opens through a face thereof, tubular conduit means substantially engaging said face of said device in encirclement of said port, and a flange union fitting comprising a body encircling the tubular means and having a mating face that engages the face of said device when said body and device are connected, said body having two coaxially arranged circular openings of different diameters joined by an annular shoulder, the larger opening extending inwardly from said mating face and accommodating the end portion of said tubular means with substantial radial clearance, the smaller opening accommodating said tubular means with slight radial clearance, a sleeve-like resilient element encircling said end portion of said tubular means and in a free state having an axial length greater than the distance between said shoulder and mating face, said body having a relief passage that opens through the wall of said larger opening for permitting excess resilient material of said resilient element to be displaced into said passage during squeezing of said element, and means for effecting connection of said body to said device by a translational movement that causes said element to be squeezed between said shoulder and the face of said device for imposing a radial sealing force on said end portion of said tubular means for thereby effecting a pressure-tight fluid connection between said tubular means and the port in said device.

4. A flange union fitting for effecting a pressure-tight fluid connection between a device having a port through a face thereof and a tubular conduit means substantially engaging said face, said fitting comprising a body having one end that engages the face of the device when the body is connected to the device, said body having one bore accommodating said tubular means with slight radial clearance and coaxially alignable with the port and extending inwardly from the opposite end of said body and joined by a first annular shoulder to a coaxially arranged larger bore that is joined by a second annular shoulder to a larger counterbore that opens through said one end of said body, a resilient element encircling the tubular means and comprising a sleeve having at one end an outwardly directed annular flange, the unflanged part of said sleeve having in a free state an axial length greater than the distance between said first and second shoulders and the flanged part of said sleeve having an axial length greater than the distance between said second shoulder and one end of said body, the radial thickness of said unflanged part being slightly less than the radial clearance between said tubular means and the wall of said larger bore, the outer diameter of said flange being less than the diameter of the counterbore, said body having at least one relief recess open to the wall of said larger bore, and means for effecting connection of said body to said device by a translational movement while at the same time causing squeezing of said element between said first shoulder and the face of the device, such that excess resilient material of the unflanged part of said element will be displaced radially into said relief recess and excess resilient material of said flanged part will be displaced radially into contact with the wall of said counterbore and the resilient element will be so confined as to impose a sealing force against the exterior of the tubular means and face of the device.

References Cited in the file of this patent

UNITED STATES PATENTS

| | | |
|---|---|---|
| 320,645 | Fischer | June 23, 1885 |
| 591,468 | Gold | Oct. 12, 1897 |
| 1,029,715 | Robinson | June 18, 1912 |
| 1,057,169 | Prellwitz | Mar. 25, 1913 |
| 1,630,657 | Crocker | May 31, 1927 |
| 1,862,153 | Lee | June 7, 1932 |
| 2,211,776 | Haury | Aug. 20, 1940 |
| 2,273,398 | Couty | Feb. 17, 1942 |
| 2,494,849 | Whitney | Jan. 17, 1950 |
| 2,562,359 | Iredell | July 31, 1951 |
| 2,631,047 | Spender | Mar. 10, 1953 |